United States Patent [19]

Liebler

[11] 4,455,403

[45] Jun. 19, 1984

[54] SILICONE RESIN COATING AGENT

[75] Inventor: Ralf Liebler, Darmstadt, Fed. Rep. of Germany

[73] Assignee: Röhm GmbH, Darmstadt, Fed. Rep. of Germany

[21] Appl. No.: 411,023

[22] Filed: Aug. 24, 1982

[30] Foreign Application Priority Data

Sep. 2, 1981 [DE] Fed. Rep. of Germany ....... 3134777

[51] Int. Cl.$^3$ ............................................... C08K 5/09
[52] U.S. Cl. .................................... 524/300; 524/322; 524/396
[58] Field of Search ............... 524/300, 322, 396, 398, 524/399, 806, 837, 838

[56] References Cited

U.S. PATENT DOCUMENTS

| 4,006,271 | 2/1977 | French et al. | 427/164 |
| 4,026,720 | 5/1977 | Ikeda | 106/287 SB |
| 4,208,312 | 6/1980 | Okada et al. | 528/12 |
| 4,223,121 | 9/1980 | Burzynski | 528/12 |
| 4,338,375 | 7/1982 | Hashimoto | 428/412 |

FOREIGN PATENT DOCUMENTS 1001743 8/1965 United Kingdom .

OTHER PUBLICATIONS

Ullmanns Encyclopedia of Technical Chemistry, 4th Ed.; vol. 21, Verlag Chemie, pp. 530–531.
Applied Polymer Symposium, 19, John Wiley & Sons, Inc., (1972), pp. 75–76.
Chem. Abstr., 90, 24888e, 153570.
Chem. Abstr., 88, 154503v.

Primary Examiner—Joseph L. Schofer
Assistant Examiner—Judy M. Reddick
Attorney, Agent, or Firm—Curtis, Morris & Safford

[57] ABSTRACT

What are disclosed are coating formulations having improved storage stability comprising a silicone resin prepared by the condensation of partially hydrolyzed organosilane compounds in the presence of acids and further containing an alkanoic acid having from 6 to 21 carbon atoms.

15 Claims, No Drawings

SILICONE RESIN COATING AGENT

The present invention relates to coating formulations comprising silicone resins in an aqueous/organic solution which possess very high storage stability.

Condensation products of partially hydrolyzed organosilicon compounds are useful coating compositions for industry. It is state of the art to prepare such condensation products from hydrolyzed silanes obtained with the aid of acid catalysis.

Thus, an improved process for the preparation of organopolysiloxanes is known from U.S. Pat. No. 4,223,121, in which process trialkoxysilanes are hydrolyzed in an aqueous solution in a ratio corresponding at least to the stoichiometric amount of water required for hydrolysis up to a water-to-silane ratio of about 10, at an acid pH. The solution is then brought to an elevated temperature in order to condense the hydrolyzed silane to an organopolysiloxane. In the patent, the improvement involves the use of formic acid in the range from about 4,800 to about 300,000 ppm to obtain the acid pH value. Such condensation products are preferably used for the coating of glass and plastic surfaces.

According to this patent, the use of formic acid makes it possible to employ considerably higher acid concentrations (about 700 ppm) in the hydrolysis at the start of the process than have been held possible up to now. Even with the next-higher homolog, acetic acid, this advantage is again lost.

From earlier German Pat. No. 25 22 241, the use of from 5 to 30 weight percent of acetic acid in the hydrolysis of siloxanes formed of four components is known. The pot life of the coating agents obtained by this route is decidedly improved, in accordance with the invention, by the addition of alkali-metal and/or zinc salts of naphthenic acids as catalysts.

According to U.S. Pat. No. 4,006,271, the hydrolysis of alkyl-tri(lower alkoxy)silanes is carried out with dilute mineral acids or acetic acid in the course of a process for the production of coating materials for polycarbonate. Solutions of the partial hydrolysates in a water-miscible, volatile organic solvent are used, which solutions contain from about 0.1 to about 20 weight percent of an abrasion-resistance enhancer of the aminoalkyltrialkoxysilane type and at least 0.05 part of a stabilizing weak acid such as acetic acid per part of the enhancer.

As taught in this U.S. patent, acids with a pKa value higher than $5 \times 10^{-3}$ are too strong for the purpose, while acids with a pKa lower than $5 \times 10^{-5}$ are regarded as too weak.

A process for the coating of plastic lenses is known from Japanese published patent application 78 85 874 (Chem. Abstr. 90, 24888e), in which process triethoxymethylsilane, among other substances, is subjected to partial hydrolysis in the presence of zinc naphthenate, pivalic acid, and surfactants.

Partially hydrolyzed alkyltrialkoxysilanes, in whose hydrolysis ammonium hydroxide or the salts of ammonium hydroxide with $C_1$ to $C_5$ fatty acids and surfactants have been used, are used according to Japanese published patent application 78 144 959 (Chem. Abstr. 90, 153570) also to coat lenses.

Moreover, coating agents prepared from partially hydrolyzed alkyltrialkoxysilanes are known from Japanese published patent application 77 152 439 (Chem. Abstr. 88, 154503v). The partially hydrolyzed condensates contain $C_5$ carboxylic acids at a pH between 3 and 6, which is said to improve their storage life. Named by way of example is a partial hydrolysate of trimethoxymethylsilane in ethanol, which is mixed with sodium acetate, ethyl acetate, ethanol, and trimethylacetic acid and is said to have a pot life of over one month.

However, the prior art means and methods have not proved fully satisfactory. It has been found in practice that as a rule the prior art coating mixtures are not sufficiently curable even after a relatively short storage time, with the result that the coatings produced with them fail to meet prevailing abrasion resistance requirements.

It has now been found that condensation products of partially hydrolyzed organosilicon compounds which are intended for use as coatings are substantially improved when they contain higher carboxylic acids. For the purposes of the present invention, higher carboxylic acids are, in particular, linear and branched alkane carboxylic acids (alkanoic acids) having a total of from 6 to 21 carbon atoms in the molecule, and, more particularly, linear and branched alkane carboxylic acids having a total of from 8 to 12 carbon atoms in the molecule, and specifically such non-cyclic alkanoic acids having a total of 8 carbon atoms, such as octanoic acid, 2-ethylhexanoic acid, and their isomers.

For the preparation of the coating formulations in accordance with the invention, the organosilicon compounds known from the prior art, such as alkyltrialkoxy silanes, dialkyldialkoxysilanes and the similarly used aromatically substituted silanes, as well as the similarly used functionally substituted organosilicon compounds, are suitable. Among these are, for example, the compounds of the formula

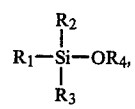

wherein $R_1$, $R_2$ and $R_3$ are, independently of one another, a $-(O)_nR_5$ group, $R_4$ and $R_5$ being alkyl having from 1 to 5 carbon atoms, vinyl or allyl, or phenyl, preferably methyl or ethyl, and n means zero or one; or wherein $R_4$ and/or $R_5$ are $H[NH-(CH_2)_{m'}-]_p-NH(CH_2)_m-$, m and m' standing for an integer from 1 to 6, and p for zero or one; or wherein $R_4$ and/or $R_5$ are

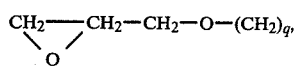

q standing for an integer from 1 to 6; or wherein $R_4$ and/or $R_5$ are

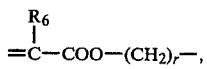

wherein $R_6$ is hydrogen or methyl and r is an integer from 1 to 6, with the proviso that when $R_4$ and $R_5$ are not alike, one of them is alkyl having 1 to 5 carbon atoms, or is vinyl, allyl, or phenyl.

The aqueous coating formulations in accordance with the invention are prepared by hydrolysis, preferably catalyzed by acids, of organosilicon compounds like those aforementioned, and particularly those of the formula given above, with an amount of water sufficient for hydrolysis. That is to say, 0.5 mole of water, or more, is used per mole of the groups to be hydrolyzed, for example, the alkoxy groups. The acids added may be inorganic acids such as hydrochloric acid, sulfuric acid, phosphoric acid, nitric acid, etc., or organic acids such as carboxylic acids, organic sulfonic acids, etc., or acidic ion exchangers. The pH of the hydrolysis reaction is as a rule between 2 and 4.5, and preferably 3. Generally a temperature rise will be observed after the reactants have been brought together. In some cases it may be necessary to add heat to start the reaction, for example by heating the mixture to a temperature ranging from 40° to 50° C. It is advisable to see to it that the reaction temperature does not exceed 55° C. The reaction time generally is fairly short, usually less than one hour, for example 45 minutes. For the purpose of working up, part of the water-alcohol mixture and of the volatile acids is suitably drawn off under vacuum. Suitable organic solvents, for example, alcohols such as ethanol, methanol, isopropanol or n-butanol, ethers such as diethyl ether or dioxane, ethers and esters of polyols such as ethylene glycol or propylene glycol, as well as the ether-esters of these compounds, hydrocarbons such as aromatic hydrocarbons, or ketones such as acetone or methyl ethyl ketone may then be used to adjust to a solids content of about 15 to 35 weight percent (calculated as $SiO_2$). Particularly preferred solvents are, for example, $C_3$- and $C_4$-alcohols and ethyl glycol. It has further proved advantageous to add to the formulations solvents which normally partially dissolve the plastic that serves as substrate for the coating. For example, when polymethyl methacrylate (PMMA) is used as substrate, it is advisable to add solvents such as toluene, acetone, or tetrahydrofuran in amounts equal to from 2 to 20% of the total weight of the formulations. The water content of the formulations in accordance with the invention is generally set at 5 to 20 weight percent, and preferably 13±2 weight percent, based on the total weight of the formulations. When higher carboxylic acids as defined above have not already been added for the purpose of hydrolysis, one or more higher carboxylic acids are, in accordance with the invention, added to the formulations prior to storage in such amounts that from 0.01 to 1 mole, and preferably from 0.05 to 0.2 mole, and especially from 0.1 to 0.15 mole, of higher carboxylic acid is used per mole of silane.

The pH value of the aqueous coating formulations of the invention should range from 3 to 6, and preferably from 4.5 to 5. It has been found that over this range there is very little condensation during storage. That pH range can be adjusted in known manner, for example, by the addition of suitable bases such as alkali metal, alkaline earth metal, or ammonium hydroxides, optionally in an alcohol solution, or corresponding salts of weak acids such as the carbonates or acetates, or buffer solutions.

Curing catalysts in the form of zinc compounds and/or other metal compounds such as cobalt, copper, or calcium compounds are advantageously added to the coating formulations in accordance with the invention. The amount of these curing catalysts usually is equal to from 0.1 to 2 weight percent, based on the total formulation. Examples are the naphthenate, octoate, acetate, sulfate, etc., of zinc or the other metals named above.

The coating formulations so obtained possess very good curing characteristics along with excellent storage stability. They will harden in a relatively short time, for example within 4 to 6 hours and usually within about 5 hours, and at a relatively low temperature ranging, for example, from 90° to 110° C., and preferably at about 100° C., into highly abrasion resistant, adherent coatings.

The formulations in accordance with the invention are suited for the coating of the surfaces of solid synthetic resins, for example of glass-like substrates, in particular of synthetic polymers comprising an acrylic resin such as polymethyl methacrylate and its various modifications, polycarbonate, melamine-formaldehyde resins, polystyrene, polyvinyl chloride, polyethylene, polypropylene, tetrafluoroethylene, and the like. Within certain limits, the proper coating weight depends on the substrate to be coated. As a rule, the coating weight, expressed as a weight of solids, will range from 2 to 6 $g/m^2$. The coating thickness will generally range from 0.25 to 25 microns.

The substrates may be coated by dipping and controlled withdrawal from the solution of the surfaces being coated. Withdrawal may be effected at a rate ranging from 10 to 40 cm/min. Coating methods such as spray coating, flow coating and fluidized-bed coating are also applicable.

The substrates so coated are cured in an appropriate manner, preferably by tempering at an elevated temperature, generally 80° to 100° C., for 2 to 6 hours, and preferably for about 5 hours, in a drying oven. The coating formulations in accordance with the invention retain the advantageous properties of comparable prior art coating materials. They may also include additives known from the prior art, such as UV absorbers, dyes, pigments, antistatic agents, antioxidants, wetting agents, antifoaming agents, antifouling additives, and the like in the amounts commonly used. Surfaces coated with the formulations of the invention are easily cleaned.

The surface coatings obtained by the use of the coating formulations of the invention possess extremely high abrasion resistance, high adhesive strength, durability, thermal stability, crazing resistance, gloss, optical uniformity, resistance to moisture and solvents, and the like.

The coating formulations in accordance with the invention are further distinguished by extremely good storage stability, usually more than 16 days at 30° C.

A better understanding of the invention and of its many advantages will be had from the following specific Examples, given by way of illustration.

Testing methods

For acceleration of the storage-stability test, the formulations were stored at 30° C.

Dip coating was followed by a 5-hour cure at 100° C.

Abrasion resistance was determined by rubbing with No. 00 steel wool.

Adhesion was determined by means of the grating-cut test according to DIN 53 151.

EXAMPLES 1 TO 3

Basic formulation

A mixture of 300 g of methyltriethoxysilane, 136 g of water and 28 g of 2-ethylhexanoic acid is heated with stirring to about 50° C. until exothermic reaction sets in. The temperature is held below 55° C. by cooling. After ¾ hour, 198 g of the ethanol-water mixture is removed under vaccum, the residue is diluted with 73 g of n-butyl alcohol, 11 g of ethyl glycol, and 7 g of toluene, and the water content is adjusted to 13%. After the addition of 8 g of a 3.5% methanolic potassium hydroxide solution, the batch is divided, 112 g each of coating solution being mixed with 0.55 g of zinc octoate (Example 1) and 0.45 g of $ZnSO_4.7H_2O$ (Example 2).

The curability of the coating solutions is preserved during storage at 30° C. for 18 days in Example 1 and for 22 days in Example 2. Adhesion to PMMA is excellent in both cases even beyond that period.

Example 3: In a comparison test, acetic acid is used in place of 2-ethylhexanoic acid. With zinc octoate, curability is preserved during storage at 30° C. for not more than 7 days. Comparable results are obtained using other silane mixtures in place of 300 g of methyl triethoxysilane, viz.

228 g of methyltriethoxy silane plus 98 g of phenyltriethoxy silane, or 180 g of methyltrimethoxy silane plus 35 g of dimethyldiethoxy silane plus 25 g of tetraethoxy silane, or 281 g of methyltriethoxy silane plus 27 g of methacryloyloxipropyltrimethoxy silane, or 271 g of methyltriethoxy silane plus 30 g of vinyltriethoxy silane, or 217 g of methyltriethoxy silane plus 20 g of glycidyloxypropyltrimethoxy silane.

EXAMPLES 4 TO 11

1,000 g of methyltriethoxy silane, 454 g of water and 50 g of a strongly acidic ion exchanger (Bayer "Lewatit SC 102") are heated to 40° C. with stirring until exothermic reaction sets in. The temperature is then held below 50° C. by cooling. Hydrolysis is completed after about 1 hour. After 663 g of the ethanol-water mixture have been drawn off under vacuum, the residue is diluted with 242 g of n-butyl alcohol, 37 g of ethyl glycol, and 24 g of toluene, and a mixture of 50 g of 2-ethylhexanoic acid and 44 g of octanoic acid is added. The water content is adjusted to 15%. Finally the ion exchanger is filtered off, 32 g of a 3.5% methanolic potassium hydroxide solution are added, and the batch is divided into 130 g portions which are then mixed with various metal compounds. The results are presented in following Table I.

TABLE I

| Formulation | Curing catalyst | | Coating solution is curable to an abrasion resistant coating when stored at 30° C. for (days) | Good adhesion when stored at 30° C. for (days) |
|---|---|---|---|---|
| Example 4 | 0.65 g | zinc octoate | 17 | 19 |
| Example 5 | 0.49 g | zinc acetylacetonate | 16 | more than 19 |
| Example 6 | 0.53 g | $ZnSO_4.7H_2O$ | 17 | more than 19 |
| Example 7 | 0.42 g | zinc hydroxide carbonate | 19 | more than 19 |
| Example 8 | 0.75 g | zinc naphthenate | 17 | 19 |
| Example 9 | 0.74 g | cobalt naphthenate | 14 | 16 |
| Example 10 | 0.75 g | copper naphthenate | 12 | 16 |
| Example 11 | 0.70 g | calcium naphthenate | 14 | 15 |

Comparable good results were obtained also with other appropriate testing methods, for example, the Taber abrasion method (ASTM D 1044) and the sand trickle method (DIN 52 348 E).

EXAMPLES 12 TO 21

The same procedure is employed as in examples 4 to 11. After the ethanol-water mixture has been drawn off under vacuum, the residue is diluted with 273 g of isopropyl alcohol and 30 g of toluene and the ion exchanger is filtered off.

The batch is divided into 110 g portions which are mixed with various noncyclic alkanoic acids. After the water content is adjusted to 13% by weight, 3.2 g of a 3.5% methanolic potassium hydroxide solution and 0.61 g of zinc octoate are added as a catalyst.

Test specimens of PMMA and polycarbonate, respectively, are dip coated with the above mixture and are cured at 100° C. or 120° C., respectively, for 5 hours.

The results are presented in following Table II.

TABLE II

| Formulation | Alkanoic acids | | Coating solution is curable to an abrasion resistant coating, when stored at 30° C. for (days) | Good adhesion when stored at 30° C. for (days) |
|---|---|---|---|---|
| Example 12 | 7.6 g | 2-Ethylbutyric acid | 12 | >19 |
| Example 13 | 7.6 g | Caproic acid | 12 | >19 |
| Example 14 | 9.4 g | 2-Ethylhexanoic acid | 18 | >19 |
| Example 15 | 9.4 g | Caprylic acid | 18 | >19 |
| Example 16 | 10.3 g | i-Nonanoic acid | 16 | >19 |
| Example 17 | 11.2 g | Capric acid | 16 | >19 |
| Example 18 | 11.2 g | i-Decanoic acid | 15 | >19 |
| Example 19 | 13.1 g | Lauric acid | 14 | >19 |
| Example 20 | 14.0 g | i-Tridecanoic acid | 12 | >19 |

TABLE II-continued

| Formulation | Alkanoic acids | | Coating solution is curable to an abrasion resistant coating, when stored at 30° C. for (days) | Good adhesion when stored at 30° C. for (days) |
| --- | --- | --- | --- | --- |
| Example 21 | 16.7 g | Palmitic acid | 11 | >19 |

What is claimed is:

1. An aqueous coating formulation having improved storage stability of at least 16 days at 30° C., consisting essentially of water, an alkanoic acid having from 8 carbon atoms, and a silicone resin condensation product prepared by condensing an organosilicon compound partially hydrolyzed in the presence of an inorganic acid, an organic acid, or on acidic ion exchanger.

2. A coating formulation as in claim 1 containing 0.01 mole to 1 mole of alkanoic acid per mole of organosilicon compound used in said condensation.

3. A coating formulation as in claim 1 wherein said organosilicon compound condensed is a partial hydrolysis product of a compound of the formula

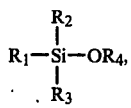

wherein $R_1$, $R_2$, and $R_3$ are the same or different and are —$(O)_nR_5$, where n is zero or one, $R_4$ and $R_5$ are alkyl having 1 to 5 carbon atoms, vinyl, allyl, or phenyl, or $R_4$ and/or $R_5$ are

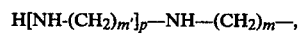

where m and m' are integers from 1 to 6 and p is zero or one, or $R_4$ and/or $R_5$ are

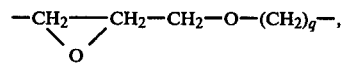

where q is an integer from 1 to 6, or $R_4$ and/or $R_5$ are

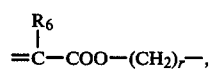

where $R_6$ is hydrogen or methyl and r is an integer from 1 to 6, with the proviso that when $R_4$ and $R_5$ are not alike, then one of them is alkyl having from 1 to 5 carbon atoms, vinyl, allyl, or phenyl.

4. A coating formulation as in claim 1 wherein said partially hydrolyzed organosilicon compounds have been partially hydrolyzed in the presence of an alkanoic acid having 8 carbon atoms.

5. A coating formulation as in claim 1, wherein alkanoic acid is added after the organosilicon compounds have been partially hydrolyzed.

6. A coating formulation as in claim 1 wherein at least 0.5 mole of water per mole of the group to be hydrolyzed is used in preparing said partially hydrolyzed organosilicon compound.

7. A coating formulation as in claim 1 comprising 5 to 20 percent by weight of water.

8. An aqueous coating formulation having improved storage stability of at least 16 days at 30° C., consisting essentially of water, an organic solvent in an amount such that the solids content of the formulation is about 15 to 35 percent by weight, an alkanoic acid having 8 carbon atoms, and a silicone resin condensation product prepared by condensing an organosilicon compound partially hydrolyzed in the presence of an inorganic acid, an organic acid, or on acidic ion exchanger.

9. A coating formulation as in claim 8 wherein said organosilicon compound condensed is a partial hydrolysis product of a compound of the formula

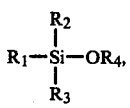

wherein $R_1$, $R_2$, and $R_3$ are the same or different and are —$(O)_nR_5$, where n is zero or one, $R_4$ and $R_5$ are alkyl having 1 to 5 carbon atoms, vinyl, allyl, or phenyl, or $R_4$ and/or $R_5$ are

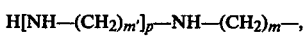

where m and m' are integers from 1 to 6 and p is zero or one, or $R_4$ and/or $R_5$ are

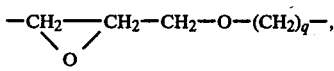

where q is an integer from 1 to 6, or $R_4$ and/or $R_5$ are

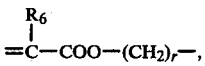

where $R_6$ is hydrogen or methyl and r is an integer from 1 to 6, with the proviso that when $R_4$ and $R_5$ are not alike, then one of them is alkyl having from 1 to 5 carbon atoms, vinyl, allyl, or phenyl.

10. An aqueous coating formulation having improved storage stability of at least 16 days at 30° C., consisting essentially of water, about 0.1 to 2 percent by weight of at least one metal compound as a curing catalyst, an alkanoic acid having carbon atoms, and a silicone resin condensation product prepared by condensing an organosilicon compound partially hydrolyzed in the presence of an inorganic acid, an organic acid, or on acidic ion exchanger.

11. A coating formulation as in claim 10 wherein said organosilicon compound condensed is a partial hydrolysis product of a compound of the formula $$R_1-\underset{\underset{R_3}{|}}{\overset{\overset{R_2}{|}}{Si}}-OR_4,$$

wherein $R_1$, $R_2$, and $R_3$ are the same or different and are $-(O)_nR_5$, where n is zero or one, $R_4$ and $R_5$ are alkyl having 1 to 5 carbon atoms, vinyl, allyl, or phenyl, or $R_4$ and/or $R_5$ are $$H[NH-(CH_2)_{m'}]_p-NH-(CH_2)_m-,$$

where m and m' are integers from 1 to 6 and p is zero or one, or $R_4$ and/or $R_5$ are $$-CH_2-\underset{O}{\overset{}{\underset{\diagdown\,\diagup}{}}}-CH_2-CH_2-O-(CH_2)_q-,$$

where q is an integer from 1 to 6, or
$R_4$ and/or $R_5$ are $$=\overset{\overset{R_6}{|}}{C}-COO-(CH_2)_r-,$$

where $R_6$ is hydrogen or methyl and r is an integer from 1 to 6, with the proviso that when $R_4$ and $R_5$ are not alike, then one of them is alkyl having from 1 to 5 carbon atoms, vinyl, allyl, or phenyl.

12. A coating formulation as in claim 10 wherein said metal compound is selected from the group consisting of zinc, cobalt, copper and calcium salts.

13. A coating formulation as in claim 10 wherein said metal compound curing catalyst is zinc octoate.

14. An aqueous coating formulation having improved storage stability of at least 16 days at 30° C., consisting essentially of water, an organic solvent in an amount such that the solids content of the formulation is about 15 to 35 percent by weight, about 0.1 to 2 percent by weight of at least one metal compound as a curing catalyst, an alkanoic acid having 8 carbon atoms, and a silicone resin condensation product prepared by condensing an organosilicon compound partially hydrolyzed in the presence of an inorganic acid, an organic acid, or on acidic ion exchanger.

15. A coating formulation as in claim 14 wherein said metal compound curing catalyst is zinc octoate.

* * * * *